United States Patent Office 3,321,266
Patented May 23, 1967

3,321,266
PROCESS FOR THE DYEING AND PRINTING
OF POLYPROPYLENE FIBERS
Hermann Wunderlich, Cologne-Mulheim, and Max
Schwarz, Leverkusen, Germany, assignors to Farbenfabriken Bayer Aktiengesellschaft, Leverkusen, Germany, a corporation of Germany
No Drawing. Filed Jan. 9, 1964, Ser. No. 336,616
Claims priority, application Germany, Jan. 11, 1963,
F 38,745
14 Claims. (Cl. 8—42)

The present invention relates, in general, to the art of dyeing and printing and, in particular, to an improved method for dyeing and printing of fibers, yarns, and fabrics composed of hydrophobic textile fibers. More particularly, the present invention is directed to an improved process for the dyeing and printing of fibers, yarns and fabrics of polypropylene.

One of the most difficult problems involved in the development of any new textile fiber involves the development, obviously, by necessity, of satisfactory methods by which the new fiber may be rendered dye-receptive. As has so often proven to be the case, whenever a new fiber is introduced it becomes necessary to devise entirely new dyeing and printing methods. In point of fact, sometimes, new dyestuffs must be developed for the fibers before they can be marketed successfully. Heretofore, various processes for obtaining textile fibers from polypropylene characterized by good receptivity for dyes have been proposed. One such process for improving the dyeability of polypropylene fiber materials which has been suggested invloves the mixing of the polypropylene resin with other resins such as polyamides, polyimines, polyesters or epoxy resins so as to render the fibers dyeable, and the mixtures, thus obtained, are spun according to the normal spinning techniques known in the art. Another process for rendering polypropylene fibrous materials dye-receptive involves the treatment of the polyolefin fiber with a reactive monomer in the presence of agents which catalyze the polymerization thereof onto the polypropylene fiber. The reactive monomers are thus bound onto the fibers by means of "graft polymerization." Typical reactive monomers which have been employed heretofore include vinyl monomers such as acrylonitrile, styrene, vinyl esters, nitrogen-containing monomers such as vinyl pyrridines, isopropenyl pyrridines, and other acid monomers. A variation of the last-mentioned process involves mixing various monomers with the polypropylene prior to, or during the spinning stage, and subjecting the resulting mixture to the usual technological operations for preparing textile fibers. Still another process which has been practiced heretofore involves the chemical treatment of the polyolefin fiber such as by subjecting the same to sulfonation, and treating the resulting sulfonated product with amines to create active dye-receptive sites.

Still another process heretofore proposed for rendering polypropylene fibers dye-receptive involves the milling of various inorganic salts with the resin such as the halides of zinc, cadmium, mercury, calcium and magnesium to create active sites on the spun fiber for "anchoring" of the dyestuff molecule onto the fiber.

In spite of these advances, it has not yet been possible to dye or print modified and unmodified polypropylene materials of fibrous structure in a manner which provides a dyed or printed product which has satisfactory light-fasteness and which has good dry-cleaning and washing properties.

Surprisingly, it has now been found that fibers of modified and unmodified polypropylene can be dyed or printed in a simple way, and with hitherto unattainable fastness properties by using monoazo dyestuffs of the thiadiazole and triazole series which are free of sulphonic acid groups and have the general formula:

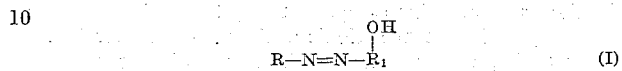

wherein R represents a heterocyclic nucleus selected from the group consisting of a thiadiazolyl radical and a triazolyl radical, and $R_1$ represents an azo coupling component free of sulfonic acid groups of the phenolic or enolic type in which the azo group is in a position adjacent to the hydroxyl group; the dyestuffs may further contain substituents customary in the manufacture of monoazo dyestuffs such as nitro, cyano, alkyl, alkoxy, optionally substituted amino, acylamino, hydroxy, thiocyano, carboxylic acid, halogen, trifluoroalkyl, sulphone groups, sulphonamide, substituted sulphonamide, carbonamide and carboxylic acid ester groups.

In particular, the process of the invention is carried out by applying the finely-dispersed dyestuffs represented by Formula I above to the polypropylene fibers or fabrics as neutral, acidic or alkaline aqueous suspensions, with the use of dispersing agents or emulsifiers, from a dyebath or padding liquor, preferably at temperatures of 50° C.–130° C. nI the case of pad-dyeing, an intermediate drying at 70° C.–90° C. folowed by a brief heating to 130° C. is expedient. When temperatures up to 100° C., are employed, it is generally advantageous to add a customary carrier substance, such as trichlorobenzene, diphenyl, diphenyl ether or esters of aromatic carboxylic acids, to the dyebath.

Dispersing agents or emulsifiers which are advantageously added to the dyestuffs, are the commercial products, such as sulphite cellulose decomposition products, condensation products from higher alcohols and ethylene oxide, soaps, polyglycol ethers of fatty acid amides, formaldehyde condensation products of aromatic sulphonic acids, or mixtures of such compounds.

The dyestuffs which are barely soluble to insoluble in water can also be applied to polypropylene fabrics by a printing process. The printing paste can be thickened with a customary thickening agent, such as methyl cellulose, caro bean flour, crystal gum or sodium alginate, and may also contain the usual additives to printing pastes, such as urea, thiourea or thioglycol, or other additives used for applying water-insoluble dyestuffs, such as methylated alcohols, sodium-m-nitrobenzosulphate or aqueous emulsions of sulphonated oils. The printing paste is expediently applied to the fabric by printing with a printing block, spraying device, stencil, sieve or roller, whereupon the printed fabric is dried, and, if desired, steamed at atmospheric pressure or, if a temperature above 100° C., e.g. between 100° C. and 130° C., is required, in a closed vessel under superatmospheric pressure.

After the dyeing or printing of the polypropylene fibrous fabrics, the colored materials can be after-treated in usual manner, such as, for example, by treating them with a hot aqueous soap solution and/or a solution of a synthetic detergent.

In the synthesis of the dyestuffs represented by Formula I, above, a diazo compound, derived from amines of the thiadiazole or triazole series, is reacted with an azo coupling component in a manner well known in the art. Typical and representative amines of the thiadiazole or triazole series are 5-amino-3-phenyl-thiadiazole-1,2,4;
5-amino-3-methyl-thiazole-1,2,4;
5-amino-3-ethyl-thiadiazole-1,2,4;
5-amino-3-benzyl-thiadiazole-1,2,4;
5-amino-2-methyl-thiadiazole-1,2,4;
5-amino-2-phenyl-thiadiazole-1,2,4;
3-amino-triazole-1,2,4;
3-amino-1-methyl-triazole-1,2,4;

and the like.

As azo coupling components any compound which will function as a coupling component may be employed provided that it is free of sulfonic acid groups. Preferably, the coupling components contain a phenolic or enolic hydroxyl group and include hydroxybenzene and its nuclear-substituted products, hydroxynaphthalenes, 5-pyrazolones, acylacetic acid arylamides, hydroxy-thionaphthenes, among others. Of the numerous suitable components, the following may be mentioned, by way of example: 2-hydroxynaphthalene; 2-hydroxy-8-methylsulphonylaminonaphthalene; 2-hydroxynaphthalene-3-carboxylic acid; 2-hydroxynaphthalene-3-carboxylic acid anilide; 2-hydroxy-8-(2,4-dichlorobenzoylamino)-naphthalene, 2-hydroxy-8-acetylaminonaphthalene, 1-hydroxynaphthalene-3-sulphonemethylene ether-4, as represented by the formula;

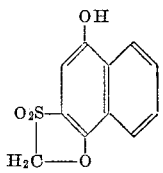

1-N-methyl-4-hydroxy-carbostyrile, as represented by the formula;

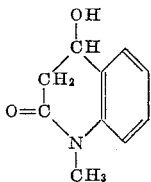

3-hydroxy-5,6,7-trichlorothionaphthene, 2,4-dihydroxydihydroquinoline, 1 - hydroxynaphthalene; 4 - methylhydroxybenzene; 1-acetylamino - 4 - hydroxybenzene, 4-chlorohydroxybenzene, 3 - hydroxy-1-N-ethylaminobenzene; 3-hydroxy-diphenylamine, 1-phenyl - 3 - methyl-5-pyrazolone; 1-phenyl-5-pyrazolone - 3 - carboxylic acidmethyl- or -ethyl ester; 1-(3'-chlorophenyl)-3-pyrazolone; 1 - (2',5'-dichlorophenyl)-3-methyl-5-pyrazolone; and acetoacetic acid anilide. In addition to the foregoing enumerated components numerous further substitution products of the coupling components may obviously also be used, provided that they are free of sulfonic acid groups.

The monoazo dyestuffs employed in accordance with the invention draw very rapidly on the polypropylene fiber. The dyeings and prints thus obtainable are distinguished by very good fastness properties. Besides a very good fastness to dry cleaning, the excellent fastness to rubbing, washing and light is particularly noteworthy.

In general, the amount of dyestuffs employed to produce satisfactory results can be varied over a wide range and, thus, is not narrowly critical. Amounts of from about 0.0005 weight percent to about 5.0 weight percent based on the weight of the dyebath are sufficient to achieve satisfactory results, for example.

The modified and unmodified polypropylene materials which can be dyed or printed in accordance with the invention are well known in the art and include both the isotactic and atactic types as well as mixtures thereof. Polypropylenes of the types disclosed in U.S. Patents 3,022,174, 3,022,191, 3,022,267, 3,035,035, 3,037,862 and 3,042,640, are suitable for use in the process of the invention. Particularly preferred modified polypropylenes useful in the process of the invention are the metal-modified polypropylenes which have been spun with metal compounds of nickel, zinc, magnesium, copper or cobalt, such as nickel phenolates or bis-(alkylphenol)-monosulfides, zinc stearate, zinc oxide, zinc dibutyl dithiocarbamate and the like.

It is believed that the foregoing principles and procedures and the invention itself may be best understood by reference to the following specific examples illustrating the dyeing of typical fibers according to the unique process of the invention:

*Example I*

Two-tenths of a gram of the dyestuff of the formula:

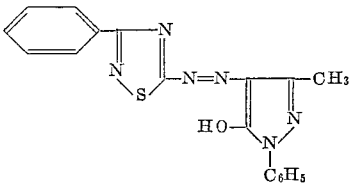

were dispersed in 400 milliliters of water containing 0.2 gram of a naphthalene-sulphonic acid/formaldehyde condensation product as a dispersing agent and 0.2 milliliter of 30% acetic acid, and dyed onto 10 grams of a polypropylene fiber yarn which had been spun with nickel phenolates of bis-(alkylphenol)-monosulphides as well as ultra violet light absorbers and stabilizers at boiling temperatures for one (1) hour. After a subsequent weakly alkaline after-treatment at 50° C. with the addition of 0.5 gram/liter of a commercial detergent, an orange dyeing of very good fastness to wetting, rubbing, solvents and light was obtained.

Very valuable dyeings on nickel-modified polypropylene materials were also obtained by employing the azo couplers set forth in the following Table I in the dyestuff instead of 1-phenyl-3-methyl-pyrazolone-5 coupler employed above:

TABLE I

| | Shade of dyeing on nickel - modified polypropylene materials |
|---|---|
| Acetoacetic acid anilide | Greenish-yellow. |
| Acetylacetone | Yellow. |
| β-Napthol | Red-violet. |
| 2 - hydroxy - 8 - acetylamino-naphthalene | Violet. |
| 1 - hydroxynaphthalene-3-sulphonomethylene ether-4 | Violet. |
| 1-methyl-4-hydroxy-carbostyrile | Yellowish-orange. |
| 1-butyl-4-hydroxy-carbostyrile | Yellowish-orange. |
| 3-methyl-pyrazolone-5 | Yellow. |
| 1 - (2',5' - dichlorophenyl)-3-methyl-pyrazolone-5 | Yellow. |
| 3 - hydroxy - 1 - N,N-diethylaminobenzene | Bluish-red. |
| 3-hydroxy-diphenylamine | Violet. |
| 3-hydroxy-N-ethylaminobenzene | Bordo-red. |
| 4-hydroxy-1-methylbenzene | Olive-tinted green |
| 4-hydroxy-1-tertiary butylbenzene | Olive. |
| 4-hydroxy-1-N-acetylbenzene | Bluish-green. |
| 3-hydroxy-4'-methyldiphenylamine | Bluish-bordo. |
| 3-hydroxy-2'-methyldiphenylamine | Bluish-red. |
| 2-hydroxynaphthoic acid-3 | Bluish-bordo. |
| 2-hydroxynaphthoic acid-3-anilid | Bluish-bordo. |

A yellow dyeing with excellent fastness properties was obtained with the dyestuff:

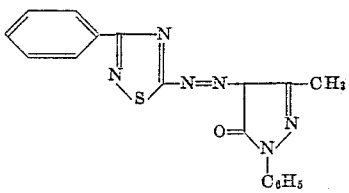

when dyed onto polypropylene fibers which were spun with zinc in the form of zinc stearate, zinc dibutyl dithiocarbamate or zinc oxide.

*Example 2*

One hundred (100) grams of polypropylene fiber material in the form of combed material were dyed at 100° C. for one (1) hour with 1 gram of the finely-dispersed dyestuff of the formula:

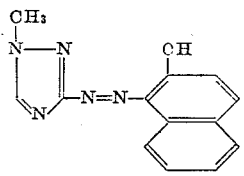

in 2 liters of water which was adjusted with dilute sulphuric acid to a pH of 4–5 and contained 4 grams of methyl salicylate and 4 grams of a weakly anion-active alkylphenyl polyglycol ether sulphate. The somewhat bluish-red dyeing thus obtained was characterized by very good fastness properties.

When the azo coupler in the dyestuff of this example was replaced by the azo couplers of Table II, dyestuffs were obtained which likewise yielded valuable dyeings on metal-modified polypropylene materials in the stated shades.

TABLE II

| Azo coupler: | Shade of dyeing on polypropylene fibers modified with metals or metal compounds |
|---|---|
| 1(3'-chlorophenyl)-3-pyrazolone-5 | Yellow. |
| 1(2',5'-dichlorophenyl-3-methyl-pyrazolone-5 | Yellow. |
| Acetoacetic acid anilide | Greenish-yellow. |
| 2-hydroxy-8-acetylaminonaphthalene | Red. |

*Example 3*

Ten (10) grams of endless polypropylene yarn of the type described in Example I were treated at 90° C. for thirty (30) minutes in a bath of 400 milliliters of water containing 1 gram of trichlorobenzene, 0.2 gram of a naphthalenesulphonic acid/formaldehyde condensation product and 0.2 gram of the dyestuff of the formula:

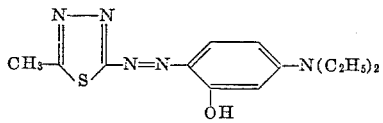

in finely-dispersed form. By employing the after-treatment described in Example I, a reddish-bordo with excellent fastness properties was obtained. When the phenyl derivative of the dyestuff was used, instead of the methyl derivative, a red-violet dyeing with very good fastness properties was obtained.

Very good dyeing results were likewise obtained on polypropylene fibers which were spun with zinc in the form of zinc stearate or zinc butyl dithiocarbamate.

When employing the azo couplers mentioned in the following Table (III) instead of the azo coupler of this example, valuable dyeings were likewise obtained on metal-modified polypropylene fibers.

TABLE III

| Azo coupler: | Shade on nickel-modified polypropylene fibers |
|---|---|
| 3-hydroxy-N-ethylaminobenzene | Bordo. |
| 1-phenyl-3-methylpyrazolone-5 | Yellow. |
| β-Napthol | Bluish-bordo. |

Having thus described the subject matter of our invention, what is desired to secure by Letters Patent is:

1. A process for the dyeing and printing of polypropylene fibers which comprises, dyeing the fibers with an aqueous dispersion of a monazo dyestuff free of sulfonic acid groups and characterized by the formula:

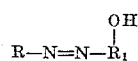

wherein R represents a heterocyclic nucleus selected from the group consisting of a thiadiazolyl radical and a triazolyl radical, and $R_1$ represents the residue of an azo coupling component wherein the hydroxyl substituent is in an ortho-position with respect to the azo bridge.

2. A process for the dyeing and printing of metal-modified polypropylene fibers which comprises, dyeing the fibers with an aqueous dispersion of a monoazo dyestuff free of sulfonic acid groups and characterized by the formula:

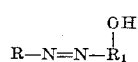

wherein R represents a heterocyclic nucleus selected from the group consisting of a thiadiazolyl radical and a triazolyl radical, and $R_1$ represents the residue of an azo coupling component wherein the hydroxyl substituent is in an ortho-position with respect to the azo bridge.

3. The process as claimed in claim 2, wherein the polypropylene fiber is modified by a metal selected from the group consisting of nickel, zinc, magnesium, copper and cobalt.

4. A process for the dyeing and printing of nickel-modified polypropylene fibers which comprises, dyeing the fibers with an aqueous dispersion of a monoazo dyestuff free of sulfonic acid groups and characterized by the formula:

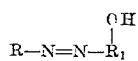

wherein R represents a heterocyclic nucleus selected from the group consisting of a thiadiazolyl radical and a triazolyl radical, and $R_1$ represents the residue of an azo coupling component wherein the hydroxyl substituent is in an ortho-position with respect to the azo bridge.

5. A process for the dyeing and printing of zinc-modified polypropylene fibers which comprises, dyeing the fibers with an aqueous dispersion of a monoazo dyestuff free of sulfonic acid groups and characterized by the formula:

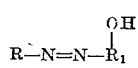

wherein R represents a heterocyclic nucleus selected from the group consisting of a thiadiazolyl radical and a triazolyl radical, and $R_1$ represents the residue of an azo coupling component wherein the hydroxyl substituent is in an ortho-position with respect to the azo bridge.

6. A process for the dyeing and printing of metal-modified polypropylene fibers which comprises, dyeing the fibers at a temperature in the range of from 50° C. to 130° C. in an aqueous dyebath containing a monoazo dyestuff of the formula:

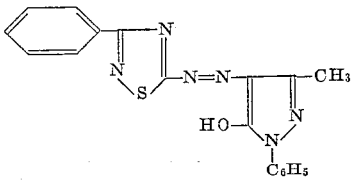

7. A process for the dyeing and printing of metal-modified polypropylene fibers which comprises, dyeing the fibers at a temperature in the range of from 50° C. to 130° C. in an aqueous dyebath containing a monoazo dyestuff of the formula:

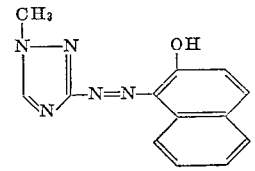

8. A process for the dyeing and printing of metal-modified polypropylene fibers which comprises, dyeing the fibers at a temperature in the range of from 50° C. to 130° C. in an aqueous dyebath containing a monoazo dyestuff of the formula:

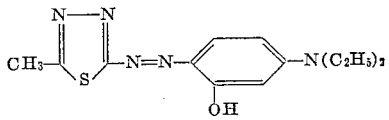

9. A process for the dyeing and printing of nickel-modified polypropylene fibers which comprises, dyeing the fibers at a temperature in the range of from 50° C. to 130° C. in an aqueous dyebath containing a monoazo dyestuff of the formula:

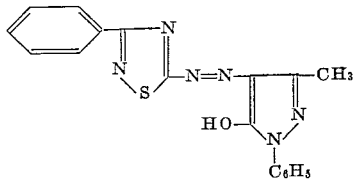

10. A process for the dyeing and printing of nickel-modified polypropylene fibers which comprises, dyeing the fibers at a temperature in the range of from 50° C. to 130° C. in an aqueous dyebath containing a monoazo dyestuff of the formula:

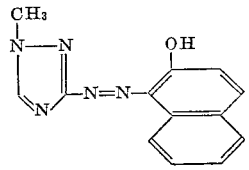

11. A process for the dyeing and printing of nickel-modified polypropylene fibers which comprises, dyeing the fibers at a temperature in the range of from 50° C. to 130° C. in an aqueous dyebath containing a monoazo dyestuff of the formula:

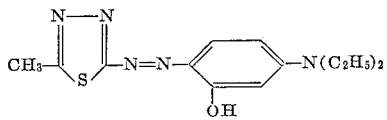

12. A process for the dyeing and printing of zinc-modified polypropylene fibers which comprises, dyeing the fibers at a temperature in the range of from 50° C. to 130° C. in an aqueous dyebath containing a monoazo dyestuff of the formula:

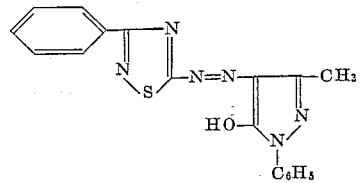

13. A process for the dyeing and printing of zinc-modified polypropylene fibers which comprises, dyeing the fibers at a temperature in the range of from 50° C. to 130° C. in an aqueous dyebath containing a monoazo dyestuff of the formula:

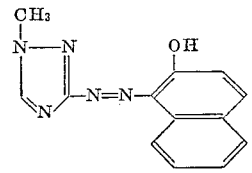

14. A process for the dyeing and printing of zinc-modified polypropylene fibers which comprises, dyeing the fibers at a temperature in the range of from 50° C. to 130° C. in an aqueous dyebath containing a monoazo dyestuff of the formula:

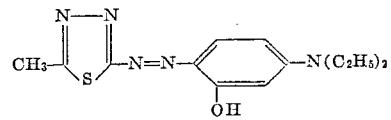

References Cited by the Examiner

UNITED STATES PATENTS

| | | | |
|---|---|---|---|
| 3,071,428 | 1/1963 | Gross et al. | 8—42 |
| 3,084,151 | 4/1963 | Gross et al. | 8—42 X |
| 3,163,492 | 12/1964 | Thomas | 8—55 |
| 3,203,750 | 8/1965 | Carbonell et al. | 8—55 X |

NORMAN G. TORCHIN, *Primary Examiner.*

T. J. HERBERT, *Assistant Examiner.*